United States Patent
Boutros et al.

(10) Patent No.: US 7,188,363 B1
(45) Date of Patent: Mar. 6, 2007

(54) METHOD AND APPARATUS FOR ADDING AND UPDATING PROTOCOL INSPECTION KNOWLEDGE TO FIREWALL PROCESSING DURING RUNTIME

(75) Inventors: Sami Boutros, Kanata (CA); Steve H. Truong, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/504,005

(22) Filed: Feb. 14, 2000

(51) Int. Cl.
*G06F 9/00* (2006.01)
*G06F 15/16* (2006.01)
*G06F 17/00* (2006.01)

(52) U.S. Cl. .................. 726/13; 726/14; 709/223; 709/224; 709/225

(58) Field of Classification Search ............... 713/200, 713/159, 167, 165, 202, 151, 164, 201; 709/223–225, 709/227, 229; 717/176, 170; 726/11, 13–14
See application file for complete search history.

(56) References Cited

U.S. PATENT DOCUMENTS

| | | | | |
|---|---|---|---|---|
| 5,732,275 A * | 3/1998 | Kullick et al. | ............... | 717/170 |
| 5,987,517 A * | 11/1999 | Firth et al. | .................. | 709/230 |
| 5,996,077 A * | 11/1999 | Williams | ...................... | 726/12 |
| 6,574,666 B1 * | 6/2003 | Dutta et al. | ................. | 709/227 |
| 6,658,571 B1 * | 12/2003 | O'Brien et al. | ............. | 713/200 |

* cited by examiner

*Primary Examiner*—Kim Vu
*Assistant Examiner*—Paula Klimach
(74) *Attorney, Agent, or Firm*—Sierra Patent Group, Ltd.

(57) ABSTRACT

A method and apparatus for adding and updating protocol inspection knowledge/information to a firewall system during operation and without interrupting firewall services. The invention allows inspection modules, which contain protocol information, to be added and updated to the system without requiring a service restart of the firewall system.

20 Claims, 4 Drawing Sheets

FIG. 5

METHOD AND APPARATUS FOR ADDING AND UPDATING PROTOCOL INSPECTION KNOWLEDGE TO FIREWALL PROCESSING DURING RUNTIME

BACKGROUND OF THE INVENTION

1. Field of the Invention

This invention pertains generally to firewall systems. More particularly, the invention is a method and apparatus for adding and updating protocol inspection knowledge/information to a firewall during operation and without interrupting firewall services. The invention allows inspection modules to be added and updated to the firewall system without requiring a service restart.

2. The Prior Art

Firewalls are known in the art. In general, a firewall is a combination of hardware and software which limits the exposure of a computer or group of computers to an attack from outside. The most common use of a firewall is on a local area network (LAN) connected to the global information network, known as the Internet. Without a firewall, anyone on the Internet could theoretically connect to the corporate LAN and retrieve and/or transmit information to computers on the LAN. A firewall provides services which enforce a boundary between two or more networks. In the above example, a firewall would enforce a boundary between the LAN and the Internet.

A traditional firewall is implemented through a combination of hosts and routers. A router can control traffic at the packet level, allowing or denying packets based on the source/destination address or the port number. A host (or application gateway), on the other hand, can control traffic at the application and/or network level, allowing control based on a more detailed and protocol-dependent examination of the traffic.

Firewall technology based on the packet filtering method authorizes traffic on the basis of address and port. For example, in the case of FTP file transfer, the firewall may allow an external server to open a connection to send data to an internal host. FTP is an example of a protocol that requires intelligence in the firewall to analyze the end-to-end communication. Some protocols, such as the one used in multimedia conference applications, could be extremely complex. Other application protocols requiring analysis of the end-to-end communication may be introduced at any time. In prior firewall art, the intelligence to analyze application protocols is statically embedded in the firewall.

However, there are disadvantages associated with embedding this protocol knowledge in the firewall code. First, the firewall will typically have only static knowledge of protocol information. That is, the firewall will only have knowledge of the protocol information embedded therein which is ascertainable during the startup process of the firewall. Once started, the protocol knowledge of firewalls is fixed. Because of the growth of the Internet, new protocols are constantly being developed, particularly in the field of streaming media. Because the knowledge of the firewall is fixed after startup, the knowledge of these new protocols can not be easily added to the firewall during runtime, thereby increasing the risk of exposing the internal network, especially if the firewall has to be manually configured to relax its filtering capability to accommodate new protocols.

Currently, the primary method for adding or updating the protocol knowledge of a firewall requires restarting the firewall process. In operation, a user of the firewall would acquire a new version of the firewall code containing intelligence to support new protocols and then restart this new code. During the startup process, the firewall is able to ascertain the knowledge of the new loaded protocol(s). However, as is known in the art, the firewall services are not available during the restart process, thereby reducing the overall protection to the network, particularly if the firewall process is restarted often.

Another method for updating the protocol knowledge of the firewall comprises using a script to download protocol information to the firewall. While the use of script allows some flexibility in adding packet filtering intelligence at runtime, this approach is limited to the capability of the base firewall system to support the script. If a new protocol requires support going beyond what the base firewall system can support, or if such protocol is so complex that it cannot be expressed in a scripting language, then not only new scripts have to be added but also the base firewall capability has to be enhanced. When the base firewall capability requires such enhancement or modification, the disruption associated with implementing such enhancements or changes in the firewall services must also be overcome, which, as noted above, is not currently addressed by prior art methods.

Accordingly, there is a need for an apparatus and method which provides for the adding and updating of protocol knowledge to a firewall at runtime. The present invention satisfies these needs, as well as others, and generally overcomes the deficiencies found in the background art.

BRIEF DESCRIPTION OF THE INVENTION

The present invention is a system and method for adding and updating protocol inspection knowledge to a firewall during the runtime operation of the firewall. The invention relates to machine readable media on which are stored embodiments of the present invention. It is contemplated that any media suitable for storing instructions is within the scope of the present invention. By way of example, such media may take the form of magnetic, optical, or semiconductor media. The invention also relates to data structures that contain embodiments of the present invention, and to the transmission of data structures containing embodiments of the present invention.

Whereas prior firewall system architecture embeds the protocol knowledge within the firewall code as described above, the firewall system of the present invention comprises a firewall core which may be operatively coupled to and decoupled from one or more inspection modules.

By way of example and not of limitation, the firewall core operates in a firewall or router device and is operatively coupled for communication to a plurality of communication interfaces within the firewall device. The firewall core of the present invention is typically configured as software code executing on conventional hardware within the firewall device. More particularly, the firewall core comprises a communication unit which is configured to carry out communication with the communication interfaces and one or more inspection modules. The firewall core also includes a set of callback routines stored therein. The callback routines include one or more functions, which perform, among other things, the inspection for a particular protocol.

The inspection modules of the present invention are also typically embodied in software code suitable for execution by conventional hardware within the firewall device. Each inspection module comprises an inspection unit and a function table (a set of functions). The inspection unit is configured to communicate with the firewall core to provide inspection and authorization of corresponding protocol data provided by the firewall core to the inspection module. The function table provides a link between the inspection modules and the firewall core to thereby allow corresponding inspection modules to inspect and authorize data from the firewall core.

In operation, the communication unit of the firewall core intercepts packets transmitted into each of the communication interfaces of the firewall device. For example, the communication unit may intercept network packets entering the Ethernet port of the firewall device. The firewall core then ascertains which inspection module is designated to provide inspection of the network packet currently under consideration, normally by transmitting an inquiry to each of the inspection modules. Each inspection module then inspects the data packet and determines whether the inspection module is configured to manage the data packet (according to the protocol, for example), and communicates an acknowledgement signal to the firewall core if so configured. The firewall core then associates or "maps" a session (the pair of source address and port and destination address and port related to the data packet) with the appropriate inspection module. Subsequent packets related to the session are then routed to the appropriate inspection module according to generated mapping.

During the operation of the firewall, a "new" or "updated" inspection module may be loaded into the firewall system as described herein. By way of example, a new inspection module may be required because a new streaming protocol has been developed. An updated inspection module may be required when an existing protocol has a new revision. As described above, each inspection module includes an inspection unit and a function table. The new inspection module has a function table having a set of new functions allowing the firewall core to communicate with the new inspection module. According to the invention, the new inspection module is loaded into the memory of the firewall device.

After loading the inspection module, the firewall core is then notified of the new inspection module using any conventional notifying means including, for example, loading the function table of the new inspection module into a memory space monitored by the firewall core, or transmitting a signal to the firewall core to indicate that the new inspection module has been loaded.

After the firewall core is notified of the new inspection module, the function table of the new inspection module is loaded into the set of callback routines of the firewall core. After this sequence, the firewall core is able to route network packets associated with the protocols as described above to the appropriate inspection module, including the newly installed inspection module. The new inspection module having new protocol inspection knowledge is thus able to provide authorization therein. When network packets arrive for which the new inspection module provides inspection and authorization, the firewall core communicates the packets to the new inspection module. As noted above, the firewall core knows which inspection module, and more particularly, which function table to use, to pass packets to for processing according to a mapping between a session and an inspection module. Thus, a firewall restart is not required to enable inspection by the newly loaded inspection module.

As described above, for each new or updated protocol, a new or updated inspection module is loaded into memory. Preferably, the inspection module is loaded into a location where all inspection modules are initiated during startup. This arrangement ensures that the new module will be loaded during each firewall startup/restart process, should the firewall system be restarted for any reason.

An object of the invention is to provide a method and apparatus for adding and updating protocol inspection knowledge to a firewall process which overcomes the deficiencies of the prior art.

Another object of the invention is to provide a method and apparatus for adding and updating protocol inspection knowledge to a firewall process which is carried out during the runtime operation of the firewall process Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 1:
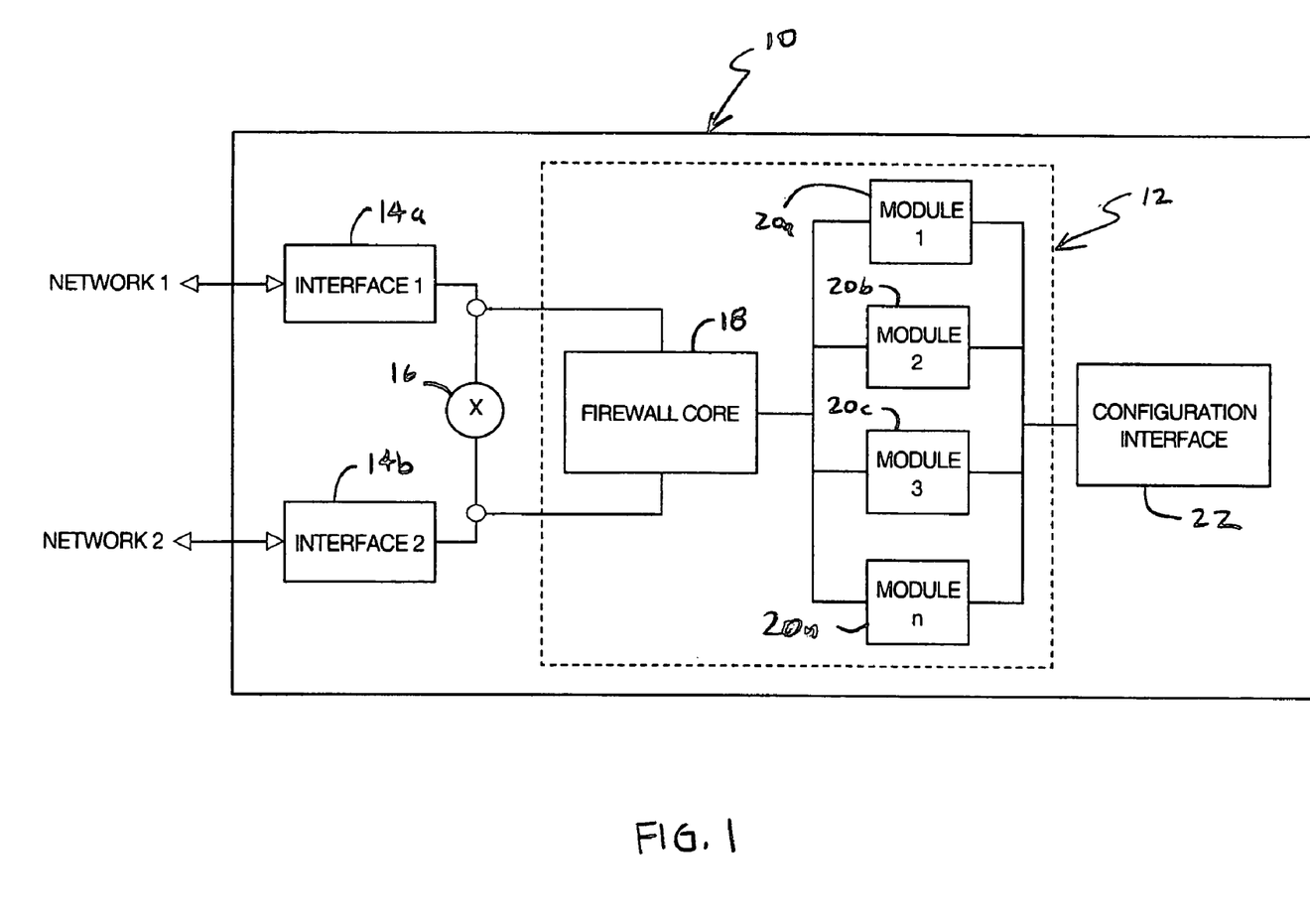
FIG. 1 is a functional block diagram depicting a firewall device having a firewall system in accordance with the present invention.
Figure 2:
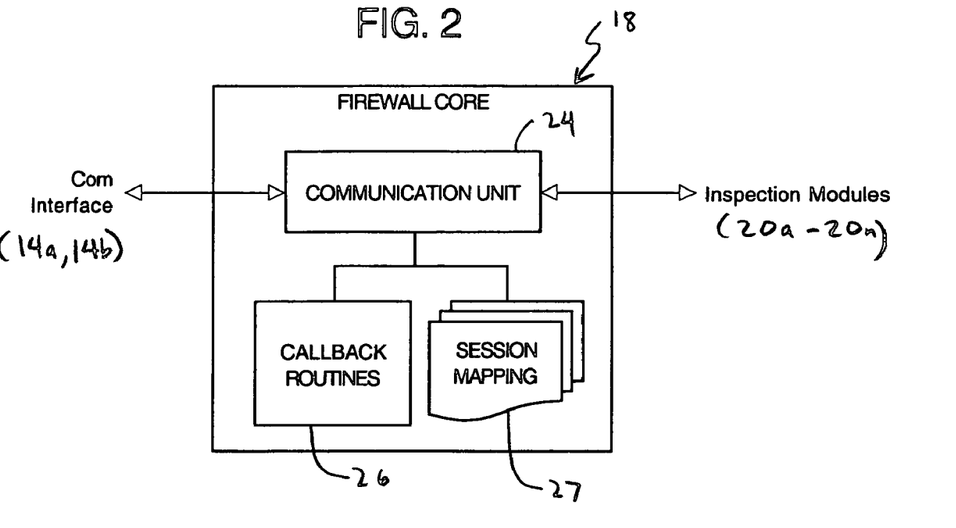
FIG. 2 is a functional block diagram depicting a firewall core in accordance with the present invention.
Figure 3:
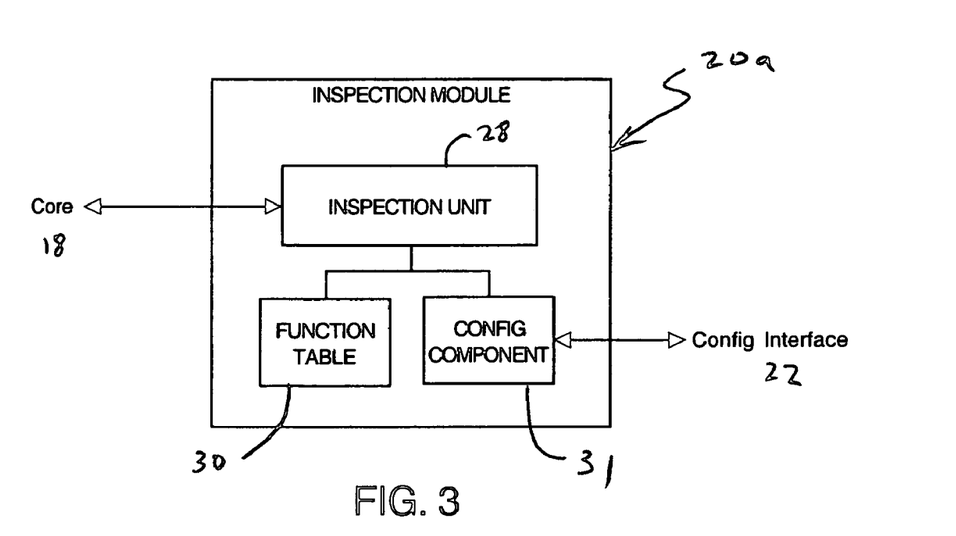
FIG. 3 is a functional block diagram depicting an inspection module in accordance with the present invention.
Figure 4:
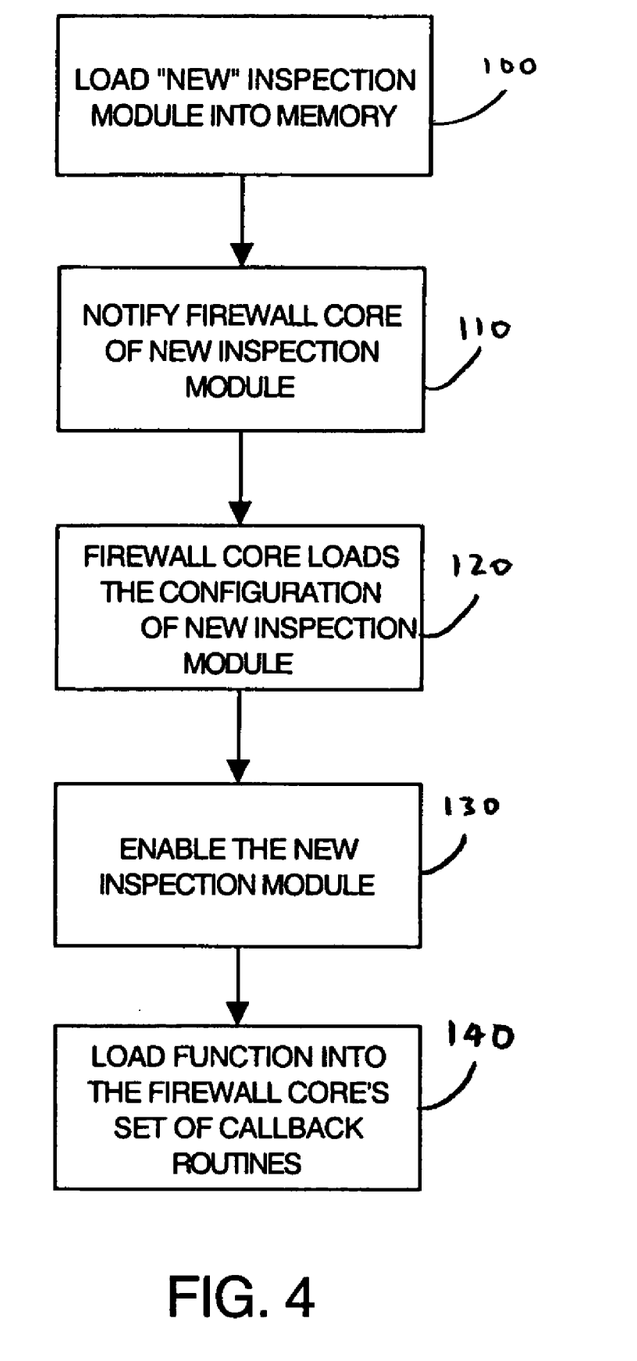
FIG. 4 is a flow chart generally showing the acts associated with installing a new inspection module to the firewall system in accordance with the present invention.
Figure 5:
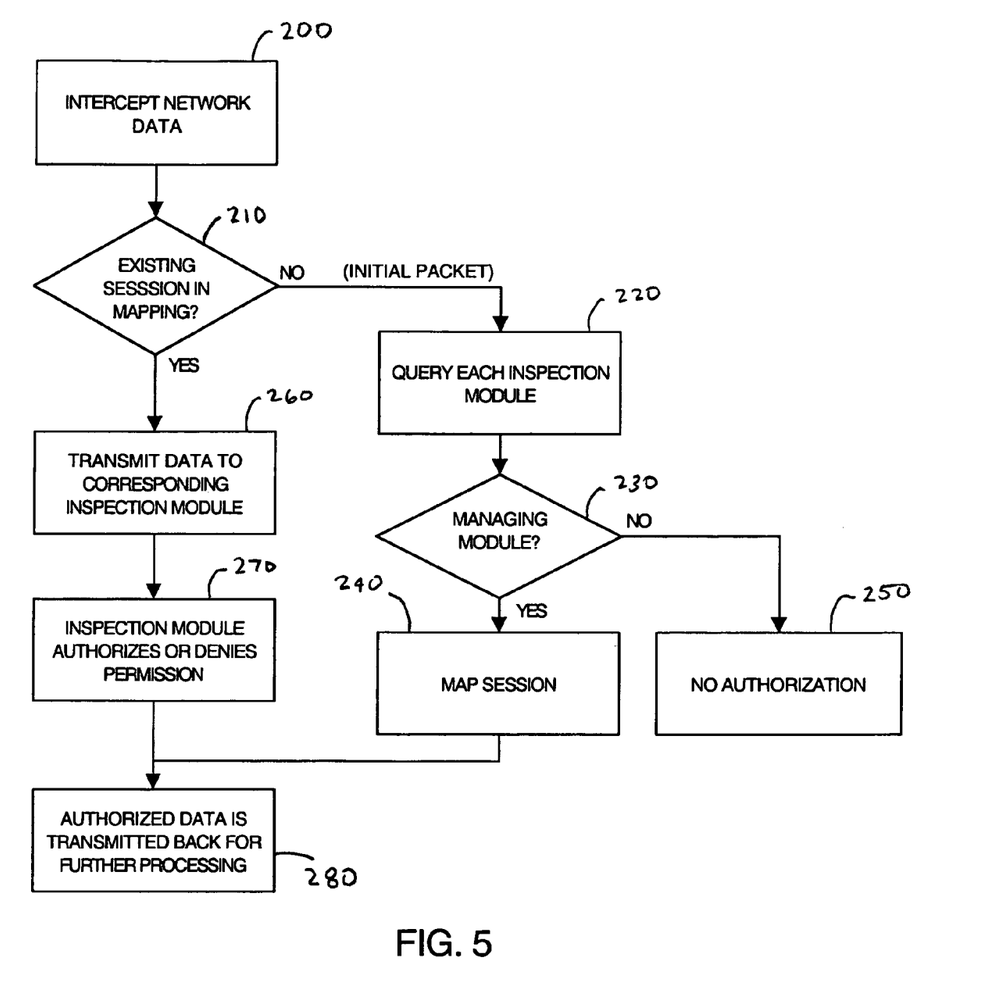
FIG. 5 is a flow chart generally showing the acts associated with providing firewall services in accordance with the present invention.

Referring more specifically to the drawings, for illustrative purposes the present invention is embodied in the apparatus shown FIG. 1 through FIG. 3 and the method outlined in FIG. 4 and FIG. 5. It will be appreciated that the apparatus may vary as to configuration and as to details of the parts, and that the method may vary as to details and the order of the acts, without departing from the basic concepts as disclosed herein. The invention is disclosed generally in terms of a firewall system and method, although numerous other uses for the invention will suggest themselves to persons of ordinary skill in the art.

Referring first to FIG. 1, there is shown a block diagram depicting a firewall device 10 having a firewall system 12 in accordance with the present invention. The firewall device 10 may be a conventional firewall device or router device, and as such comprises conventional hardware components (not shown), such as a processor and memory, for example.

The firewall device 10 also includes a plurality of communication interfaces, 14a, 14b. The communication interfaces 14a, 14b may be any conventional communication interface, such as Ethernet, serial, parallel or other communication interface. As depicted in FIG. 1, Interface 1 (14a) is operatively coupled for communication to Network 1, while Interface 2 (14b) is operatively coupled for communication to Network 2. Networks 1 and 2 may be any conventional network or group of networks, including the Internet for example.

Interfaces 14a, 14b are each coupled to a switching engine 16. The switching engine 16 comprises software code configured to carry out the operation of routing network packets between communication interfaces 14a, 14b of the firewall device 10 as is known in the art.

The firewall system 12 comprises a firewall core 18 and one or more inspection modules 20a through 20n. The firewall core 18 and the inspection modules are further described below in conjunction with FIG. 2 and FIG. 3. In general, the firewall core 18 comprises software code configured to carry out the operation of intercepting network packets communicated into interfaces 14a, 14b. For example, the firewall core 18 intercepts data communicated from interfaces 14a, 14b before it is switched to another interface. The intercepted data is communicated by the firewall core 18 to the appropriate inspection module, 20a through 20n for authorization. The process of authorizing network data is described in further detail below in conjunction with FIG. 5.

The firewall core 18 manages the processing of protocol information. It does this by using a set of callback routines 26 (FIG. 2), supplied by the inspection modules 20a through 20n and a communication session mapping 27 (FIG. 2). The callback set of routines 26 provides a plurality of callback functions allowing the firewall core 18 to communicate with the inspection modules 20a through 20n (which carry out the actual inspection and authorization as described below) for inquiry and data processing purposes, among other things.

The relationship between a communication session and an inspection module (accessible through its callback routines) is established at the beginning of the session when an inspection module claims its responsibility for an end-to-end communication and is maintained in the session mapping 27. As noted above, a session is identified by the pair of source address and port and destination address and port.

Each of the inspection modules 20a through 20n comprises software code configured to carry out the operation of providing protocol information to the firewall core 18 and provide inspection of data provided by the firewall core 18. The details of providing protocol information to the firewall core 18 are described more fully below in conjunction with FIG. 4.

In general, each inspection module 20a through 20n may be loaded and unloaded during the operation of the firewall system without having to restart the firewall core 18. For example, when a "new" (one that was not installed during startup) inspection module is loaded, it is stored into a space in memory. The firewall core 18 is then notified of the new inspection module using conventional notification means, such as communicating a signal, or by loading the new inspection module is a predetermined memory space monitored by the firewall core, for example.

After the firewall core 18 is notified of the new inspection module, certain configuration components 27 (FIG. 3) contained within the new inspection module are communicated or otherwise made available to the firewall core 18. In this way, a user of the firewall 10 is able provide configuration of the newly installed module.

The firewall core 18 then loads the associated callback function from the newly installed inspection module to the set of callback routines 26 maintained by the firewall core 18. When data matching the protocol type provided by the new inspection module is intercepted by the firewall core 18, the firewall core 18 then provides the intercepted data to the new inspection module for authorization. This process for adding a new inspection module may be carried out without restarting the firewall core 18.

A configuration interface 22 may also be operatively coupled to the inspection modules 20a through 20n to allow a user of the firewall device 10 to provide configuration, debugging, logging, and other administrative tasks to the inspection modules 20a through 20n. For example, a user may use configuration interface 22 to configure one of the inspection modules to permit or deny certain protocol packets from passing through firewall device 10. Such configuration commands are communicated to the inspection module and configured therein. Additionally, the configuration interface 22 may be configured to allow a user of the firewall device 10 to enable or modify the operation of the inspection modules 20a through 20n via a conventional user interface such as a CLUI (command line user interface), GUI (graphic user interface), or other appropriate user interface.

Referring now to FIG. 2, there is shown a functional block diagram depicting a firewall core 18 in accordance with the present invention. The firewall core 18 comprises a communication unit 24, a set of callback routines 26 and session mapping 27.

The communication unit 24 is configured to intercept data communicated into the firewall device 10, and in particular, data communicated form the communication interfaces 14a, 14b to the switching engine 16. The communication unit 24 then ascertains which inspection module is configured to provide authorization for the intercepted data by inquiring with each of the inspection modules. The inspection module determined to be associated with the data packet is then mapped to a session (address and port data related to the data packet) and this mapping is maintained in the session mapping 27. The communication unit 24 then passes subsequent intercepted packets related to the session, to the corresponding inspection module (as defined in the session mapping 27) for authorization.

The set of callback routines 26 includes a plurality of callback functions. Callback functions are provided by the inspection modules 20a through 20n to the firewall core 18 during the startup process and after the processing of the exiting configuration. In one exemplary embodiment, the inspection modules load the callback functions into a predetermined memory space monitored by the firewall core 18. During startup, the firewall core 18 loads the functions from the predetermined memory space. Also during operation the firewall core 18 is able to load functions which have been installed into the predetermined memory space. The callback functions include, among other things, functions allowing the firewall core to properly communicate with the appropriate inspection module. For example, each inspection module 20a through 20n provides an "inquiry" function allowing the firewall core to ask the inspection module whether it needs to monitor/process the packets of a particular connection. Additionally, the inspection modules 20a through 20n provide one or more other "data processing" functions to allow the firewall to transmit data packets to the inspection module for inspection and processing.

The session mapping 27 may be any data structure suitable for maintaining a plurality of mappings which associate a session to a corresponding inspection unit.

Referring next to FIG. 3, there is shown a functional block diagram depicting an inspection module 20a in accordance with the present invention. Inspection modules 20b though 20n are structured and configured as inspection module 20a as described herein. Inspection module 20a comprises an inspection unit 28, a function table 30 and a configuration component 31.

The inspection unit 28 is configured to receive data packets from the firewall core 18 and provide authorization for the data packets. The inspection unit 28 permits or denies packets based on configuration information provided by a user via configuration interface 22 to the inspection module via configuration component 31

The function table 30 includes a set of functions, each having code used by the firewall core 18 to properly communicate with the corresponding inspection module when network data is intercepted by the communication unit 24. The functions in the function table 30 are communicated by the inspection module to the firewall core 18 by loading the functions into a predetermined memory space monitored by the firewall core 18, as described above.

The method and operation of invention will be more fully understood with reference to the flow charts of FIG. 4 and FIG. 5, as well as FIG. 1 through FIG. 3. The order of actions as shown in FIG. 4 and FIG. 5 and described below is only exemplary, and should not be considered limiting.

Referring now to FIG. 4, there is generally shown the acts associated with installing a new inspection module to the firewall system in accordance with the present invention. The acts described herein may be carried out during the operation of the firewall without requiring the firewall core 18 or firewall system 12 to be restarted or otherwise reinitialized.

At box 100, a "new" inspection module is loaded into memory on the firewall device 10. A "new" inspection module is one that was not installed or loaded at the time the firewall device 10 and firewall system 12 is started or initialized. The "new" inspection module may be loaded into memory using convention installation means including, for example, installation by an external install program. The "new" inspection module will have an inspection unit 28, a function table 30, and a configuration component 31 as described above in conjunction with FIG. 3. The function table 30 of the "new" inspection module will include a set of callback functions which, among other things, allow the firewall core to request authorization of intercepted data from the inspection module. Box 110 is then carried out.

At box 110, the firewall core 18 is notified of the "new" inspection module loaded from box 110. In the preferred embodiment, the act from box 110 of loading the callback functions to the predetermined memory space provides sufficient notification to the firewall core 18 since the firewall core 18 monitors the memory space. Alternatively, a conventional "messaging" service (not shown) may be used to communicate a signal to the firewall core 18 to indicate installation of a "new" inspection module. Box 120 is then carried out.

At box 120, the firewall 18 core loads the configuration component 31 of the new inspection module. As noted above, the configuration component 31 allows a user of the firewall 10 to configure the settings of the newly installed inspection module. Box 130 is then carried out.

At box 130, a user of the firewall 10 configures the "new" inspection module to, among other things, enable it and defines configuration settings. Box 140 is then carried out.

At box 140, the firewall core 18 loads the callback functions in the function table 30 provided by the newly installed inspection module, into the set of callback routines 26 maintained by the firewall core 18 as described above in conjunction with FIG. 2.

After the process is completed, the firewall core 18 is able use the "new" protocol information provided in the callback functions loaded during box 130 to thereby transmit intercepted data packets defined by the "new" protocol information to the "new" inspection module for authorization. The above process further does not require the firewall core 18 to be restarting in order to use the "new" protocol information provided. Thus inspection module may be added to the firewall system without interrupting current firewall protection processes.

Referring now to FIG. 5, there is generally shown the acts associated with providing firewall services in accordance with the present invention.

At box 200, the communication unit 24 of the firewall core 18 monitors the network data received into the communication interfaces 14a, 14b and intercepts a data packet. As noted above, the firewall system 12 carries out the operation of authorizing data transmission communication between the communication interfaces of the firewall device 10. Diamond 210 is then carried out.

At diamond 210, the firewall core 18 ascertains whether the intercepted data packet is associated with an existing session in the session mapping 27. Typically this is carried out by inspecting the packet for address and port information (i.e., session data) and determining if an inspection module is mapped to the session data. If the intercepted packet is associated with an inspection module box 260 is carried out. Otherwise box 220 is carried out.

At box 210, the intercepted packet is not associated with an inspection module according to the session mapping 27. The firewall core 24 then queries (via an "inquiry" function provided in the callback routines 26) each of the inspection modules 20n through 20n to determine if the packet is managed by one of the inspection modules according to its protocol. In response to this query, the inspection unit 28 in each inspection module inspects the data packet to determine if the data packet includes protocol managed by the inspection module. Box 230 is then carried out.

At box 230, the firewall core 18 determines whether one of the inspection modules manages the intercepted data packet. The firewall core 18 makes this determination from a response from one of inspection module. This response will typically indicate which function to call when subsequent data related to the intercepted data packet is received. If a managing inspection module is ascertained, box 240 is carried out. Otherwise box 250 is carried out.

At box 240, the firewall core 18 receives a response from one of the inspection modules indicating that the module manages the data packet, and indicating which function to call when related data is received. In response, the firewall core 18 maps the session data of the intercepted packet with the function provided by the managing module. For subsequent session data, the firewall core 18 then calls the identified function. Box 280 is then carried out.

At box 260, the communication unit 24 transmits the intercepted data to the corresponding inspection module identified from box 210 for authorization, according to the information in the session mapping related to the intercepted data packet. Generally, this process is carried out by executing the callback function associated with the session (as mapped during box 240). Box 270 is then carried out.

At box 270, the inspection module receives the function call of box 260 and either authorizes or denies the intercepted packet. The inspection module authorizes data based on configuration information or settings provided via configuration interface 22. The inspection module communicates a response signal back to the communication unit 24 to indicate whether the data has been authorized. This authorization signal is generally provided in the form of a function result in response to the function call of box 260. Box 280 is then carried out.

At box 280, the communication unit 24 of the firewall core 18 receives the function result from box 270. Authorized data is then transmitted back for further processing. For example, data intercepted from interface 14*a* is then allowed to be switched to interface 14*b*. Data that is denied authorization is not permitted to continue communication. The above process may be carried without interruption of service while "new" inspection modules are added to the firewall system 12 as described above in conjunction with FIG. 4.

Accordingly, it will be seen that this invention provides a method and apparatus for adding and updating protocol inspection knowledge/information to a firewall during operation and without interrupting firewall services. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A firewall device for inspecting packets transmitted over a network comprising:
   a) a firewall core connected to each of a plurality of communication interfaces and executing at least one inspection module wherein each at least one inspection module is software code configured to carry out an operation of providing protocol information for a particular protocol to said firewall core; and
   b) a new inspection module inserted into an operating memory of said firewall core during operation of said firewall core wherein said new inspection module is software code configured to carry out an operation of providing protocol inspection for a new particular protocol to said firewall core wherein said new particular protocol is different from each said particular protocol provided by each said at least one inspection module and wherein each said at least one inspection module and new inspection module are each further configured to indicate to said firewall core which protocol for data packets said inspection module is configured to provide inspection.

2. The firewall device of claim 1, wherein said firewall core is configured to monitor said operating memory for said new inspection module.

3. The firewall device of claim 1, wherein each said at least one inspection module and said new inspection module each further comprise a plurality of callback functions, said plurality of callback functions communicated to said firewall core and providing communication between said firewall core and said at least one inspection module.

4. The firewall device of claim 1, wherein each data packet intercepted by said firewall core further includes session information comprising address and port data, said firewall core further configured to map said session information for each said data packet to one of said at least one inspection modules and said new inspection module.

5. A firewall core in a firewall system that inspects data packets transmitted over a network comprising:
   a communication unit where said communication unit is operatively coupled to each one of a plurality of communication interfaces connected to said network;
   a set of callback functions, retrieved from each of at least one inspection modules loaded into a memory of said firewall core, each of said set of callback functions provide communication between said firewall core and one of said at least one inspection modules and wherein each said at least one inspection module is software code configured to carry out the operation of providing protocol information and to inspect data packets of a particular protocol;
   and wherein said firewall core monitors said memory to determine when a new inspection module is loaded into said memory wherein said in new inspection module is inserted into an operating memory of said firewall core during operation of said firewall core wherein said new inspection module is software code configured to carry out an operation of providing protocol inspection for a new particular protocol to said firewall core wherein said new particular protocol is different from each said particular protocol provided by each said at least one inspection module and wherein each said at least one inspection module and new inspection module are each further configured to indicate to said firewall core which protocol for data packets said inspection module is configured to provide inspection.

6. The firewall core of claim 5, wherein said communication unit is further configured to intercept network data communicated via each of said plurality of communication interfaces.

7. The firewall core of claim 5, further comprising a session mapping unit, said data packets intercepted by said firewall core further including session information comprising address and port data, said session mapping unit further configured to map said session information to a corresponding one of said at least one inspection modules providing inspection for said protocol of said packet into a session mapping and store said session mapping into said session mapping unit.

8. The firewall core of claim 7, wherein said communication unit is further configured to communicate a packet between said communication interfaces and one of said at least one inspection modules.

9. An inspection module in a memory of a firewall device comprising software code that inspects packets transmitted over a network in a particular protocol, said inspection module comprising:
   an inspection unit configured to inspect and authorize data packets formatted in a new particular protocol wherein said new particular protocol is different from each said particular protocol provided by other inspection modules in said memory;
   a function table including a set of callback functions wherein said set if callback functions provides communication between said firewall core and said inspection module; and
   wherein said inspection module is loaded into said memory monitored by said firewall core during operation of said firewall device and indicates to said firewall core said new particular protocol for data packets said inspection module is configured to provide inspection.

10. The inspection module of claim 9, wherein said inspection module is further configured to indicate to said firewall core for said protocol for data packets to be inspected by said inspection module.

11. The inspection module of claim 9, where in said inspection unit is further configured to receive and inspect packets communicated from the firewall core to said inspection module.

12. A method for providing an inspection module for inspecting data packets of a particular protocol to a firewall system during runtime comprising:
   loading a new inspection module into a memory monitored by a firewall core during operation of said firewall system wherein said inspection module comprises software code for an application providing inspections of packets in a new particular protocol wherein said new particular protocol is different from each said particular protocol provided by other inspection modules in said memory;

communicating said set of callback functions from said inspection module to said firewall core;

indicating to said firewall core which protocol for data packets said inspection module is configured to provide inspection.

13. The method of claim 12, further comprising enabling said inspection module, prior to communicating said set of callback function to said firewall core.

14. The method of claim 12 further comprising inspecting of packets of said particular protocol by said inspection module, said packets communicated from the firewall core to said inspection module.

15. The method of claim 12 wherein said step of notifying the firewall core comprises:

transmitting a signal to the firewall core to indicate the installation of said inspection module.

16. The program storage device of claim 12, wherein said step of notifying the firewall core comprises:

transmitting a signal to the firewall core to indicate the loading of said inspection module.

17. The program storage device of claim 12, said method further comprising:

indicating by said inspection module said particular protocol of data packets that said inspection module inspects.

18. A program storage device readable by a machine, tangibly embodying a program of instructions executable by the machine to perform a method for adding protocol knowledge to a firewall system during runtime comprising, said firewall system including a firewall core, said method comprising:

loading a new inspection module into a memory monitored by said firewall core during operation of said firewall system wherein said inspection module comprises software code executable to inspect a data packet of a new particular protocol wherein said new particular protocol is different from each said particular protocol provided by other inspection modules in said memory and indicates to said firewall core said new particular protocol for data packets said inspection module is configured to provide inspection notifying the firewall core said inspection module is loaded into said memory responsive to said loading;

and communicating a set of callback functions from said inspection module to said firewall core.

19. The program storage device of claim 18, said method further comprising:

enabling said inspection module prior to communicating said set of callback functions to said firewall core.

20. The program storage device of claim 18, said method further comprising:

inspecting of packets by said inspection module, said packets communicated from the firewall core to said inspection module.

* * * * *